United States Patent
Yang

(10) Patent No.: US 9,405,144 B2
(45) Date of Patent: Aug. 2, 2016

(54) LIQUID CRYSTAL GRATING, 3D TOUCH DISPLAY DEVICE AND DRIVING METHOD OF LIQUID CRYSTAL GRATING

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventor: Shengji Yang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 113 days.

(21) Appl. No.: 14/348,282

(22) PCT Filed: Aug. 19, 2013

(86) PCT No.: PCT/CN2013/081736
§ 371 (c)(1),
(2) Date: Mar. 28, 2014

(87) PCT Pub. No.: WO2014/153916
PCT Pub. Date: Oct. 2, 2014

(65) Prior Publication Data
US 2015/0160495 A1 Jun. 11, 2015

(30) Foreign Application Priority Data
Mar. 29, 2013 (CN) .......................... 2013 1 0108678

(51) Int. Cl.
*G02F 1/1333* (2006.01)
*G02B 27/22* (2006.01)
(Continued)

(52) U.S. Cl.
CPC ........ *G02F 1/13338* (2013.01); *G02B 27/2264* (2013.01); *G02F 1/13439* (2013.01);
(Continued)

(58) Field of Classification Search
CPC ... G02F 1/13338; G06F 3/0488; G06F 3/044; G02B 27/2264
USPC .............................................. 349/12; 345/174
See application file for complete search history.

(56) References Cited

U.S. PATENT DOCUMENTS

2007/0279395 A1* 12/2007 Philipp .................... G06F 3/044
345/173

(Continued)

FOREIGN PATENT DOCUMENTS

| CN | 102692748 A | 9/2012 |
| CN | 102707514 A | 10/2012 |

(Continued)

OTHER PUBLICATIONS

Written Opinion of the International Searching Authority dated Dec. 27, 2013; PCT/CN2013/081736.
(Continued)

*Primary Examiner* — Thanh-Nhan P Nguyen
(74) *Attorney, Agent, or Firm* — Ladas & Parry LLP

(57) ABSTRACT

A liquid crystal grating, a 3D touch display device and a driving method of the liquid crystal grating are provided. The liquid crystal grating including a first substrate; a second substrate, disposed opposite to the first substrate; a liquid crystal layer, filled between the first substrate and the second substrate; a touch electrode layer, located on a side of the first substrate that faces the liquid crystal layer; and a planar electrode, located on a side of the second substrate that faces the liquid crystal layer, wherein the touch electrode layer includes a plurality of strip-shaped electrodes parallel to each other and arranged separately at a set distance, and the strip-shaped electrodes in the touch electrode layer are divided into at least two touch electrode units that are not electrically connected to each other by a set rule of pattern division, for any one of the touch electrode units, when an external conductive object touches different positions of the touch electrode unit by way of single-point touch, variation of capacitance formed between the touch electrode unit and the external conductive object differs from one another.

15 Claims, 4 Drawing Sheets

(51) Int. Cl.
G02F 1/1335 (2006.01)
G02F 1/1343 (2006.01)
G06F 3/044 (2006.01)
G06F 3/041 (2006.01)
G02B 27/26 (2006.01)

(52) U.S. Cl.
CPC .... *G02F1/133528* (2013.01); *G02F 1/134309* (2013.01); *G02F 1/134327* (2013.01); *G06F 3/044* (2013.01); *G06F 3/0412* (2013.01); *G02B 27/26* (2013.01)

(56) References Cited

U.S. PATENT DOCUMENTS

2011/0291982 A1* 12/2011 Hsieh ................ G06F 3/044
345/174

2014/0125887 A1   5/2014   Wu et al.
2014/0184943 A1   7/2014   Yang et al.

FOREIGN PATENT DOCUMENTS

CN   203054398 U   7/2013
CN   203133450 A   8/2013

OTHER PUBLICATIONS

International Search Report mailed Sep. 1, 2014; PCT/CN2013/081736.
First Chinese Office Action dated Mar. 18, 2015; Appln. No. 201310108678.7.

* cited by examiner

LIQUID CRYSTAL GRATING, 3D TOUCH DISPLAY DEVICE AND DRIVING METHOD OF LIQUID CRYSTAL GRATING

TECHNICAL FIELD

Embodiments of the present invention relate to a liquid crystal grating, a Three-Dimensional (3D) touch display device and a driving method of the liquid crystal grating.

BACKGROUND

The 3D stereoscopic display technology includes glasses-type 3D display and naked-eye 3D display. Herein, a 3D effect can be achieved by the naked-eye 3D display without any visual-aid equipment. Among the naked-eye 3D display, a 3D display device based on a liquid crystal grating has got a lot of attentions owing to its merits of simple structure, relatively compatible with liquid crystal process, good performance, etc., in which, generally, it is based on binocular parallax and the principle of light-splitting by a grating structure that a 3D stereoscopic display effect is achieved by the 3D display device based on the liquid crystal grating, which usually includes a display and a liquid crystal grating disposed on a light exiting side of the display.

In recent years, a 3D display device with a touch function has attracted more and more concern, and an existing construction of the 3D display device with the touch function is that, a touch screen is directly provided on a light exiting side of the 3D display device. For a 3D display device based on a liquid crystal grating, a 3D touch display device based on the liquid crystal grating is fabricated by means of providing an add-on touch screen on a light exiting side of the liquid crystal grating of the 3D display device.

As shown in FIG. 1, which is a structurally schematic view illustrating the 3D touch display device based on the liquid crystal grating in prior art, the 3D touch display device includes a 3D display device 11 and a touch screen 12 located on top of the 3D display device to serve as an add-on, in which, the 3D display device 11 includes a display 21 and a liquid crystal grating 22 disposed on top of the display 21; further, the liquid crystal grating 22 includes a first substrate 221, a second substrate 222, a liquid crystal layer 223 filled between the first substrate 221 and the second substrate 222, and strip-shaped electrodes 224 that are located on a side of the first substrate 221 facing the liquid crystal layer 223, parallel to each other and arranged separately at a first preset distance and a planar electrode 225 located on a side of the second substrate 222 facing the liquid crystal layer 223. Herein, FIG. 2 is a structurally top view illustrating the strip-shaped electrodes 224 on the first substrate 221. Further, the touch screen 12 may include a conductive layer, a first insulating layer, a touch electrode layer, a second insulating layer, a protective layer, and the like (not shown in FIG. 1).

As can be seen from FIG. 1, a structure of the 3D touch display device achieved by using the above method is thicker, so that the display effect of the 3D touch display device is not good, and furthermore, a manufacturing process corresponding to it is relatively complex, and production cost of the process is relatively high.

SUMMARY

According to embodiments of the invention, there are provided a liquid crystal grating, a 3D touch display device and a driving method of the liquid crystal grating, which enable the 3D touch display device to achieve a good display effect, and to have a simple manufacturing process and a reduced cost.

According to an embodiment of the invention, there is provided a liquid crystal grating, comprising: a first substrate; a second substrate, disposed opposite to the first substrate; a liquid crystal layer, filled between the first substrate and the second substrate; a touch electrode layer, located on a side of the first substrate that faces the liquid crystal layer; and a planar electrode, located on a side of the second substrate that faces the liquid crystal layer, wherein the touch electrode layer includes a plurality of strip-shaped electrodes parallel to each other and arranged separately at a set distance, and the strip-shaped electrodes in the touch electrode layer are divided into at least two touch electrode units that are not electrically connected to each other by a set rule of pattern division, for any one of the touch electrode units, when an external conductive object touches different positions of the touch electrode unit by way of single-point touch, variation of capacitance formed between the touch electrode unit and the external conductive object differs from one another.

According to an embodiment of the invention, there is provided a 3D touch display device, comprising: a display; and a liquid crystal grating, disposed on a light exiting side of the display, wherein the liquid crystal grating is the above liquid crystal grating provided by the embodiment of the invention.

According to an embodiment of the invention, there is provided a driving method of the liquid crystal grating according to the embodiment of the invention, comprising: when the liquid crystal grating is in an operating state, a planar electrode in the liquid crystal grating is grounded, and driving strip-shaped electrodes in the liquid crystal grating by way of time-division driving.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

A First Embodiment

Figure 1:
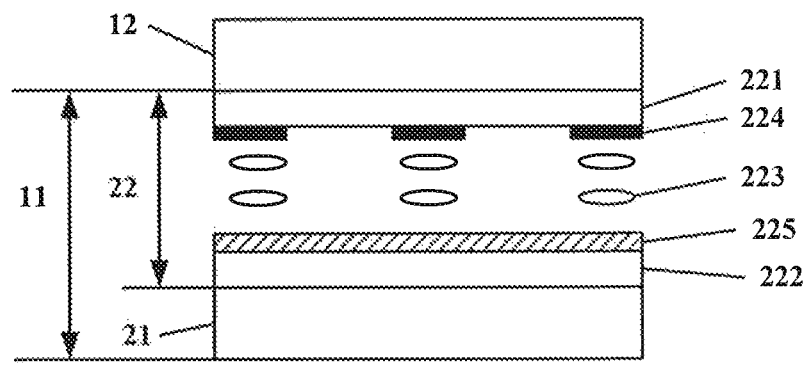
FIG. 1 is a structural cross-sectional view illustrating a 3D touch display device based on a liquid crystal grating in prior art.
Figure 2:
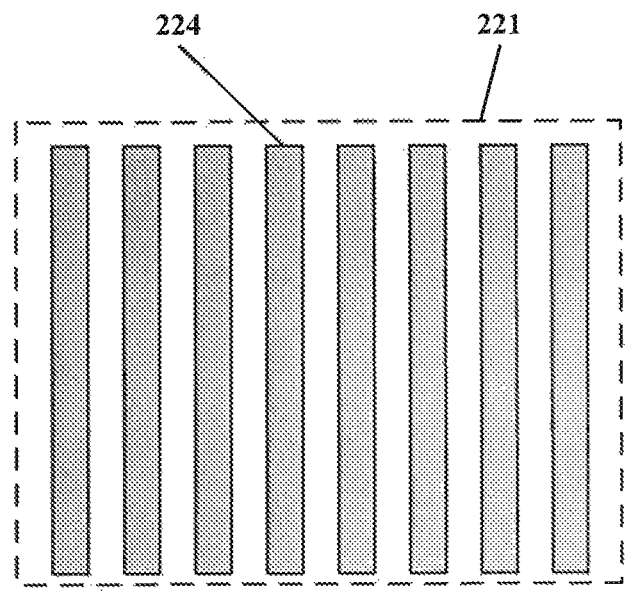
FIG. 2 is a structural top view illustrating strip-shaped electrodes on a first substrate in the 3D touch display device based on the liquid crystal grating in prior art as shown in FIG. 1.
Figure 3:
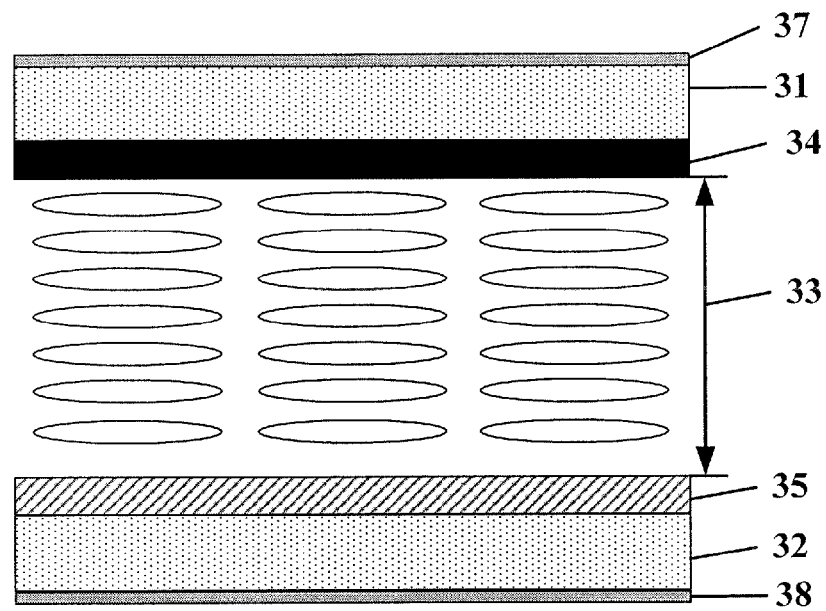
FIG. 3 is a structural cross-sectional view illustrating a liquid crystal grating according to an embodiment of the invention.

As shown in FIG. 3, a liquid crystal grating according to the first embodiment of the invention includes: a first substrate 31; a second substrate 32; and a liquid crystal layer 33 filled between the first substrate 31 and the second substrate 32. It further includes: a touch electrode layer 34, located on a side of the first substrate 31 that faces the liquid crystal layer 33; and a planar electrode 35 located on a side of the second substrate 32 that faces the liquid crystal layer 33.

Figure 4:
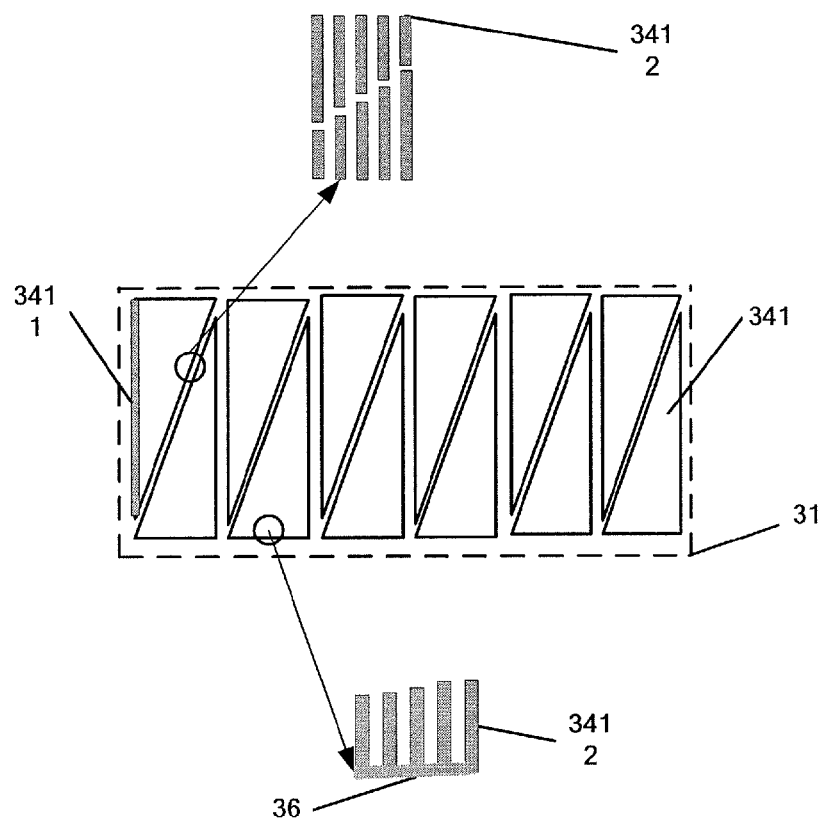
FIG. 4 is a structural top view illustrating a touch electrode layer on a first substrate of the liquid crystal grating in accordance with an embodiment of the invention.

Exemplarily, FIG. 4 is a structural top view illustrating the touch electrode layer 34 located on the first substrate 31. As shown in FIG. 4, the touch electrode layer 34 includes at least two strip-shaped electrodes 3411 parallel to each other and arranged separately at a set distance, and the strip-shaped electrodes 3411 in the touch electrode layer 34 are divided into at least two touch electrode units 341 that are not electrically connected to each other by a set rule of pattern division.

For any one touch electrode unit 341, when an external, conductive object (such as a human's finger, or the like) touches different positions of the touch electrode unit 341 by way of single-point touch, variation of capacitance formed between the touch electrode unit 341 and the external, conductive object differs from one another.

It is to be noted that, the set distance needs to be set according to actual circumstances, as long as the 3D display effect can be achieved. Embodiments of the invention do not set any limit to this. Generally speaking, the set distance may be half of width of one sub-pixel in a display, so as to achieve the 3D display effect. It is to be noted additionally that, with respect to any strip-shaped electrode 3411 in the touch electrode layer 34, the strip-shaped electrode 3411 may be divided into at least two strip-shaped sub-electrodes 3412 by a set rule of pattern division, wherein, strip-shaped sub-electrodes 3412 belonging to the same strip-shaped electrode 3411 will be located in different touch electrode units 341, and not be electrically connected to each other.

Further, with respect to any two touch electrode units 341 located on the first substrate 31, the shape taken by the two touch electrode units 341 may be the same or different, to which no any limit will be set by embodiments of the invention. Further, the shape taken by the touch electrode units 341 may be a triangle (or approximately be a triangle), a trapezoid, or the like, to which no any limit will be set by embodiments of the invention, and each touch electrode unit 341 includes at least two strip-shaped sub-electrodes 3412 parallel to each other and arranged separately at a set distance.

Exemplarily, a structure of the touch electrode layer 34 in embodiments of the invention will be further described below with reference to an example that is a structural top view illustrating the touch electrode layer 34 located on the first substrate 31 shown in FIG. 4.

In the structural top view of the touch electrode layer 34 shown in FIG. 4, the first substrate 31 has a quadrate configuration, and strip-shaped electrodes 3411 located on the first substrate 31 are arranged separately from and in parallel to each other in a horizontal direction on the premise that they are kept in a vertical status, wherein, the horizontal direction is a direction parallel to a longer side of the first substrate 31. It is to be noted that, the strip-shaped electrodes 3411 may also be arranged in any other direction according to actual requirements, to which no any limit will be made by embodiments of the invention.

Further, generally speaking, a pattern formed after combination of touch electrode units 341 may cover the whole touch electrode layer 34, and a shape of the touch electrode layer 34 is approximately the same as a shape of the first substrate 31 in general, and therefore, in the structural schematic view of the touch electrode layer 34 shown in FIG. 4, on the premise that the first substrate 31 has the quadrate configuration and the strip-shaped electrodes 3411 are kept in a vertical status and arranged separately in a horizontal direction, the pattern formed after combination of the strip-shaped electrode units 341 also has a quadrate configuration. Accordingly, in the event that the pattern formed after combination of the touch electrode units 341 is assured of being quadrate, shapes taken by any two touch electrode units 341 may be the same or different. For example, a shape taken by the touch electrode unit 341 may be a triangle, a trapezoid, or the like, to which no any limit will be made by embodiments of the invention.

Exemplarily, in the structural schematic view of the touch electrode layer 34 shown in FIG. 4, a set shape taken by each touch electrode unit 341 is a right triangle, and moreover, a non-isosceles right triangle.

Further, in embodiments of the invention, for any touch electrode unit 341, strip-shaped sub-electrodes 3412 in the touch electrode unit 341 are electrically connected to each other. Specifically, an electrical connection between the strip-shaped sub-electrodes 3412 in the touch electrode unit 341 can be achieved by a common electrode 36 that is located at an edge of the first substrate 31 and corresponds to the touch electrode unit 341 (as shown in FIG. 4); wherein, the common electrode 36 serves to apply an unified operating signal to the strip-shaped sub-electrodes 3412 in the corresponding touch electrode unit 341.

It is to be noted that, in embodiments of the invention, each of the strip-shaped electrodes 3411, the planar electrode 35 and the common electrode 36 may be made from ITO (Indium Tin Oxide) or a transparent conductive material similar to ITO, such as AZO (Al doped Zinc Oxide), to which no any limit will be made by embodiments of the invention.

It is to be noted additionally that, in embodiments of the invention, the planar electrode 35 is a whole piece of electrode of a conductive film type, and when the liquid crystal grating is in a 3D or 2D operating state, the planar electrode 35 is grounded to serve the function of a protective layer, so that interference of a signal for the display to a signal for a 3D liquid crystal grating signal and a touch signal can be reduced.

The liquid crystal grating may further include: a first polarizer 37 located on a side of the first substrate 31 that faces away from the liquid crystal layer 33; and a second polarizer 38 located on a side of the second substrate 32 that faces away from the liquid crystal layer 33, wherein, directions of transmission axes of the first polarizer 37 and the second polarizer 38 are perpendicular or parallel to each other.

Hereinafter, the operating principle of the liquid crystal grating according to embodiments of the present invention will be briefly described.

In an embodiment of the invention, when the liquid crystal grating is in a operating state, the planar electrode in the liquid crystal grating is grounded, and the strip-shaped electrodes in the liquid crystal grating is driven in a time-division driving mode, that is, each drive cycle is divided into a display time and a touch time. In the display time, a drive signal that can be used to achieve a 3D or 2D image display is applied to each strip-shaped electrode; and in the touch time, a drive signal that can be used to realize a touch function is applied to each strip-shaped electrode.

For example, in a product with a 60 HZ operating frequency, the time of one frame (drive cycle) is 1/60 (s)=16.67 ms, and 12 ms in the former part of 16.67 ms (a first time) may be acted as the display time, for achieving the 3D or 2D image display; and 4.67 ms in the latter part (a second time) may be acted as the touch time, for realizing the touch function.

Exemplarily, when the liquid crystal grating is in a 3D operating state, on condition that the planar electrode is assured of being grounded, within the first times of any two adjacent drive cycles, nonzero constant voltages with the same amplitude and opposite polarities are respectively applied to the strip-shaped electrodes of the liquid crystal grating. For example, voltages of ±5V are input to the strip-shaped electrodes, and alternate one frame by one frame, +5V is input at a first frame, and −5V is input at the next frame, so as to ensure that polarity of liquid crystal is reversed to guarantee activity of the liquid crystal. In this case, a certain voltage difference (e.g. 5V) can be formed between the strip-shaped electrodes and the planar electrode, and thus, it will allow the liquid crystal to be arranged along the strip-shaped electrodes under the action of an electric field, and light is diffracted by slits between the strip-shaped electrodes and exits, so as to form alternate bright and dark stripes. When a 3D display signal is input, a 3D display effect can be realized.

Further, when the liquid crystal grating is in a 3D operating state, within the second time of each the drive cycle, a positive constant voltage having a nonzero amplitude is applied to the strip-shaped electrodes of the liquid crystal grating. For example, a constant voltage of +5V is input to the strip-shaped electrodes. At this time, when a finger or other external, conductive object touches a certain position of a strip-shaped electrode, a position of a touch point can be determined according to variation in capacitance between it and the strip-shaped electrode. Specifically, the liquid crystal grating provided by embodiments of the invention is a self-induced touch liquid crystal grating (with reference to an example in which the set shape taken by each touch electrode unit 341 is a nonisosceles right triangle shown in FIG. 4). In view of this, when a finger contacts any touch electrode unit 341, a contact area between a finger and the touch electrode unit 341 is changed continually (increased gradually) as it moves from a vertex corresponding to a shorter right-angle side of the right triangle to the shorter right-angle side of the right triangle, which causes the capacitance between the finger and the strip-shaped sub-electrodes 3412 in the touch electrode unit 341 to change unceasingly, and therefore, a position of the current touch point can be determined by detecting change in capacitance between the finger and the strip-shaped sub-electrodes 3412 in the touch electrode unit 341.

It is to be noted that, when the liquid crystal grating is in a 3D operating state, an amplitude of a constant voltage that is input within the first time or the second time of each drive cycle may be set according to actual circumstances, to which no any limit will be made by embodiments of the invention. Furthermore, when the liquid crystal grating is in a 3D operating state, the amplitude of the constant voltage that is input within the first time and the second time of each drive cycle may be the same, and may also differ from each other, to which no any limit will be made by embodiments of the invention.

Further, when the liquid crystal grating is in a 2D operating state, on condition that the planar electrode is assured of being grounded, within the first time of each drive cycle, a constant voltage having a zero amplitude is applied to the strip-shaped electrodes of the liquid crystal grating, that is, the strip-shaped electrodes are grounded. At this time, because the voltage difference between the strip-shaped electrodes and the planar electrode is 0, liquid crystal will not be deflected and alternate bright and dark stripes can not be formed. When a 2D display signal is input, a 2D display effect can be realized.

Further, when the liquid crystal grating is in a 2D operating state, within the second time of each drive cycle, a constant voltage having a nonzero amplitude is applied to the strip-shaped electrodes of the liquid crystal grating. It is to be noted that, the amplitude of the constant voltage can be set according to actual circumstances, to which no any limit will be made by embodiments of the invention. At this time, when a finger or other external, conductive object touches a certain position of a strip-shaped electrode, a position of a touch point can be determined according to variation in capacitance between it and the strip-shaped electrode. It is to be noted that, although there is a certain voltage difference between the strip-shaped electrode and the planar electrode at this stage, a 3D grating phenomenon will not occur due to the fact that the duration of the touch time is usually shorter so that there's not enough time for the liquid crystal to deflect.

It is to be noted additionally that, 12 ms of the display time (the first time) and 4.67 ms of the touch time (the second time) are merely examples for illustrating the invention, and in a concrete procedure of implementation, the time of one frame is not limited to 16.67 ms, and a ratio between the display time and the touch time in one frame is not limited to the above ratio.

According to an embodiment of the invention, there is provided a liquid crystal grating. The liquid crystal grating includes a first substrate, a second substrate and a liquid crystal layer filled between the first substrate and the second substrate; it further includes: a touch electrode layer, located on a side of the first substrate that faces the liquid crystal layer; and a planar electrode located on a side of the second substrate that faces the liquid crystal layer, wherein, the touch electrode layer includes at least two strip-shaped electrodes parallel to each other and arranged separately at a set distance, and the strip-shaped electrodes in the touch electrode layer are divided into at least two touch electrode units that are not electrically connected to each other by a set rule of pattern division; for any touch electrode unit, when an external conductive object touches different positions of the touch electrode unit by way of single-point touch, variation of capacitance formed between the touch electrode unit and the external conductive object differs from one another.

In the technical solution according to the embodiment of the invention, by means of redesigning a pattern of strip-shaped electrodes located on the first substrate in the liquid crystal grating, strip-shaped electrodes are made to be used not only as drive sensing electrodes for touch control, but as liquid crystal driving electrodes of the 3D grating, without the necessity of adding an add-on touch screen on top of the liquid crystal grating. Thus, a manufacturing process of the 3D touch display device can be simplified, a thickness of the 3D touch display device can be reduced, the display effect of the 3D touch display device can be improved and the production cost can be reduced.

A Second Embodiment

Figure 5:
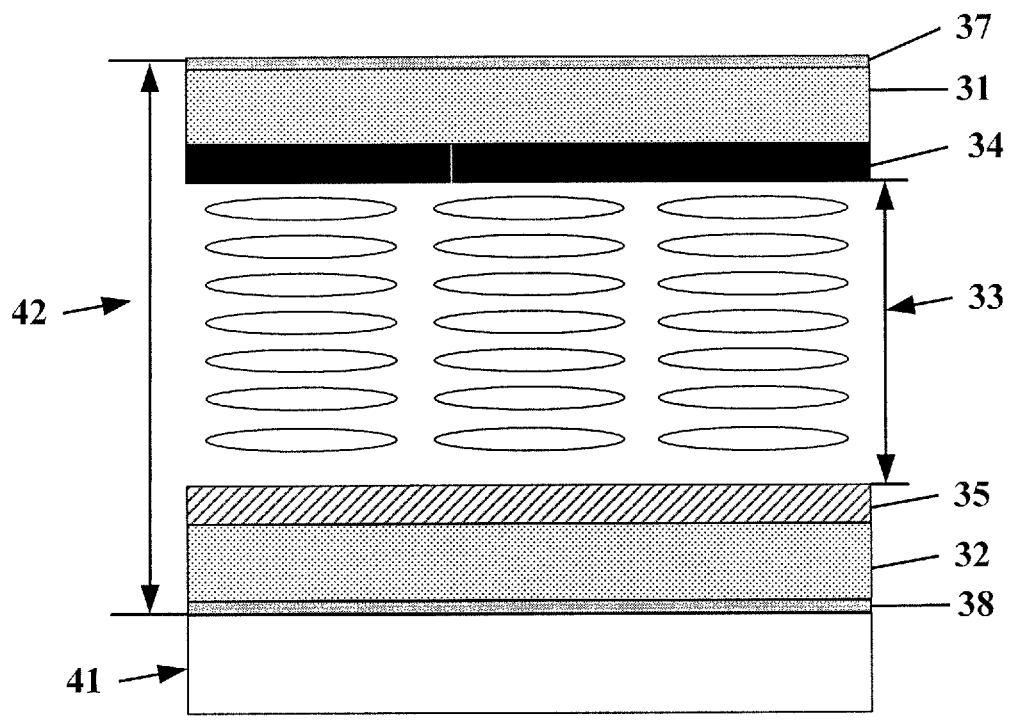
FIG. 5 is a structural cross-sectional view illustrating a 3D touch display device in accordance with an embodiment of the invention.

FIG. 5 is a structural cross-sectional view illustrating a 3D touch display device provided by the second embodiment of the invention. As shown in FIG. 5, the 3D touch display device includes a display 41 and a liquid crystal grating disposed on a light exiting side of the display 41, wherein, the liquid crystal grating 42 is a liquid crystal grating according to an embodiment of the invention, and will not be described in detail any more in the second embodiment of the invention.

Exemplarily, the display 41 may be a LCD (liquid crystal display), an OLED (organic light emitting diode display), a PDP (plasma display), a CRT (cathode ray display), or other display, to which no any limit will be made by the embodiment of the invention.

Further, an OCA (Optical Clear Adhesive), an LOCA (Liquid Optical Clear Adhesive) or the like can be used to attach the liquid crystal grating 42 to the display 41, so as to attain the 3D touch display device according to the second embodiment of the invention.

Figure 6:
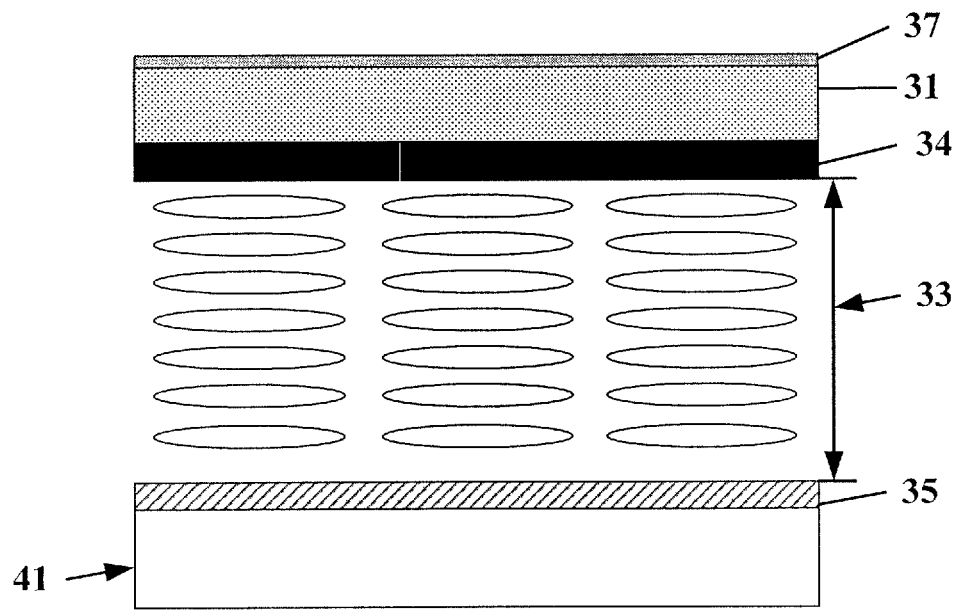
FIG. 6 is a structural cross-sectional view illustrating another 3D touch display device in accordance with an embodiment of the invention.
Figure 7:
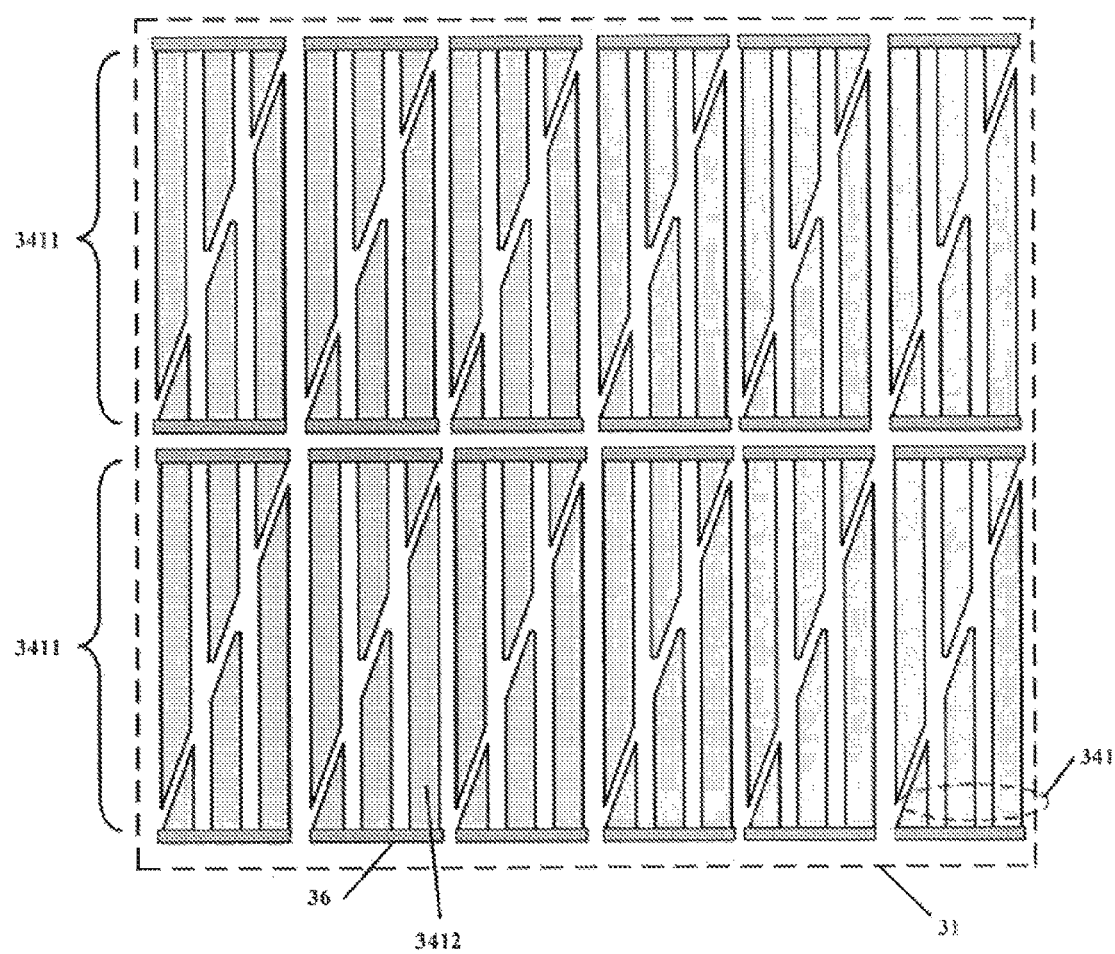
FIG. 7 is a structural top view illustrating a touch electrode layer on a first substrate of the liquid crystal grating in accordance with an embodiment of the invention.

It is to be noted that, when the liquid crystal grating 42 according to the first embodiment of the invention is attached to the display 41, an upper substrate of the display 41 and a lower substrate of the liquid crystal grating 42 may be shared, so that the upper substrate of the display 41 or the lower substrate of the liquid crystal grating 42 can be omitted. The resultant 3D touch display device in this case may be shown in FIG. 6. Furthermore, when the display 41 is a liquid crystal display, an upper polarizer of the liquid crystal display 41 and a lower polarizer of the liquid crystal grating 42 may also be shared, so that one polarizer of them can be omitted.

A Third Embodiment

According to the third embodiment, there is provided a liquid crystal grating driving method of the liquid crystal grating according to the first embodiment of the invention, which includes the following steps:

When the liquid crystal grating is in a operating state, the planar electrode in the liquid crystal grating is grounded, and the strip-shaped electrodes in the liquid crystal grating is time-division driven, that is, each drive cycle is divided into a display time and a touch time. During the display time, a drive signal that can be used to achieve a 3D or 2D image display is applied to each strip-shaped electrode; and during the touch time, a drive signal that can be used to realize a touch function is applied to each strip-shaped electrode.

For example, in a product with a 60 HZ operating frequency, the time of one frame (drive cycle) is 1/60 (s)=16.67 ms, and 12 ms in the former part of 16.67 ms (a first time) may be acted as the display time, for achieving the 3D or 2D image display; and 4.67 ms in the latter part (a second time) may be acted as the touch time, for realizing the touch function.

Exemplarily, when the liquid crystal grating is in a 3D operating state, on condition that the planar electrode is assured of being grounded, within the first times of any two adjacent drive cycles, nonzero constant voltages with the same amplitude and opposite polarities are respectively applied to the strip-shaped electrodes of the liquid crystal grating. For example, voltages of ±5V are input to the strip-shaped electrodes, and alternate one frame by one frame, +5V is input at a first frame, and −5V is input at the next frame, so as to ensure that polarity of liquid crystal is reversed to guarantee activity of the liquid crystal. In this case, a certain voltage difference (e.g. 5V) can be formed between the strip-shaped electrodes and the planar electrode, and thus, it will allow the liquid crystal to be arranged along the strip-shaped electrodes under the action of an electric field, and light is diffracted by slits between the strip-shaped electrodes and exits, so as to form alternate bright and dark stripes. When a 3D display signal is input, a 3D display effect can be realized.

Further, when the liquid crystal grating is in a 3D operating state, within the second time of each the drive cycle, a positive constant voltage having a nonzero amplitude is applied to the strip-shaped electrodes of the liquid crystal grating. For example, a constant voltage of +5V is input to the strip-shaped electrodes. At this time, when a finger or other external, conductive object touches a certain position of a strip-shaped electrode, a position of a touch point can be determined according to variation in capacitance between it and the strip-shaped electrode. Specifically, the liquid crystal grating provided by embodiments of the invention is a self-induced touch liquid crystal grating (with reference to an example in which a set shape taken by each touch electrode unit 341 is a nonisosceles right triangle shown in FIG. 4). In view of this, when a finger contacts any touch electrode unit 341, a contact area between a finger and the touch electrode unit 341 is changed continually (increased gradually) as it moves from a vertex corresponding to a shorter right-angle side of the right triangle to the shorter right-angle side of the right triangle, which causes the capacitance between the finger and the strip-shaped sub-electrodes 3412 in the touch electrode unit 341 to change unceasingly, and therefore, a position of the current touch point can be determined by detecting change in capacitance between the finger and the strip-shaped sub-electrodes 3412 in the touch electrode unit 341.

It is to be noted that, when the liquid crystal grating is in a 3D operating state, an amplitude of a constant voltage that is input within the first time or the second time of each drive cycle may be set according to actual circumstances, to which no any limit will be made by the embodiment of the invention. Furthermore, when the liquid crystal grating is in a 3D operating state, the amplitude of the constant voltage that is input within the first time and the second time of each drive cycle may be the same, and may also differ from each other, to which no any limit will be made by the embodiment of the invention Further, when the liquid crystal grating is in a 2D operating state, on condition that the planar electrode is assured of being grounded, within the first time of each drive cycle, a constant voltage having a zero amplitude is applied to the strip-shaped electrodes of the liquid crystal grating, that is, the strip-shaped electrodes are grounded. At this time, because the voltage difference between the strip-shaped electrodes and the planar electrode is 0, liquid crystal will not be deflected. When a 2D display signal is input, a 2D display effect can be realized.

Further, when the liquid crystal grating is in a 2D operating state, within the second time of each drive cycle, a constant voltage having a nonzero amplitude is applied to the strip-shaped electrodes of the liquid crystal grating. It is to be noted that, the amplitude of the constant voltage can be set according to actual circumstances, to which no any limit will be made by embodiments of the invention. At this time, when a finger or other external, conductive object touches a certain position of a strip-shaped electrode, a position of a touch point can be determined according to variation in capacitance between it and the strip-shaped electrode. It is to be noted that, although there is a certain voltage difference between the strip-shaped electrode and the planar electrode at this stage, a 3D grating phenomenon will not occur due to the fact that the duration of the touch time is usually shorter so that there's not enough time for the liquid crystal to deflect.

It is to be noted additionally that, 12 ms of the display time (the first time) and 4.67 ms of the touch time (the second time) are merely examples for illustrating the invention, and in a concrete procedure of implementation, the time of one frame is not limited to 16.67 ms, and a ratio between the display time and the touch time in one frame is not limited to the above ratio.

According to embodiments of the invention, there are provided a liquid crystal grating, a 3D touch display device and a driving method of the liquid crystal grating. The liquid crystal grating includes a first substrate, a second substrate and a liquid crystal layer filled between the first substrate and the second substrate; it further includes: a touch electrode layer, located on a side of the first substrate that faces the liquid crystal layer; and a planar electrode located on a side of the second substrate that faces the liquid crystal layer, wherein, the touch electrode layer includes at least two strip-shaped electrodes parallel to each other and arranged separately at a set distance, and the strip-shaped electrodes in the touch electrode layer are divided into at least two touch electrode units that are not electrically connected to each other by a set rule of pattern division; for any touch electrode unit, when an external conductive object touches different positions of the touch electrode unit by way of single-point touch, variation of capacitance formed between the touch electrode unit and the external conductive object differs from one another. In the technical solution according to the embodiment of the invention, by means of redesigning a pattern of strip-shaped electrodes located on the first substrate in the liquid crystal grating, strip-shaped electrodes are made to be used not only as drive sensing electrodes for touch control, but as liquid crystal driving electrodes of the 3D grating, without the necessity of adding an add-on touch screen on top of the liquid crystal grating. Thus, a manufacturing process of the 3D touch display device can be simplified, a thickness of the 3D touch display device can be reduced, the display effect of the 3D touch display device can be improved and the production cost can be reduced.

The embodiment of the invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

The invention claimed is:

1. A liquid crystal grating, comprising:
   a first substrate;
   a second substrate, disposed opposite to the first substrate;
   a liquid crystal layer, filled between the first substrate and the second substrate;
   a touch electrode layer, located on a side of the first substrate that faces the liquid crystal layer; and
   a planar electrode, located on a side of the second substrate that faces the liquid crystal layer,
   wherein the touch electrode layer includes a plurality of strip-shaped electrodes parallel to each other and arranged separately at a set distance, and the strip-shaped electrodes in the touch electrode layer are divided, based on a determined pattern segmentation rule, into at least two touch electrode units that are not electrically connected to each other,
   for any one of the touch electrode units, when an external conductive object touches different positions of the touch electrode unit by way of single-point touch, variation of capacitance formed between the touch electrode unit and the external conductive object differs from one another.

2. The liquid crystal grating claimed as claim 1, wherein any two touch electrode units have the same shape or different shapes.

3. The liquid crystal grating claimed as claim 2, wherein the shape of the touch electrode units at least includes one or more of the following shapes: a triangle or a trapezoid.

4. The liquid crystal grating claimed as claim 1, wherein for any one of the touch electrode units, strip-shaped sub-electrodes in the touch electrode unit are electrically connected to each other.

5. The liquid crystal grating claimed as claim 4, wherein for any one of the touch electrode units, the strip-shaped sub-electrodes in the touch electrode unit are electrically connected to each other through a common electrode corresponding to the touch electrode unit.

6. The liquid crystal grating claimed as claim 5, wherein the strip-shaped sub-electrodes, the planar electrode and the common electrode are made from transparent, conductive material.

7. The liquid crystal grating claimed as claim 6, wherein the transparent, conductive material is indium tin oxide or Al doped zinc oxide.

8. The liquid crystal grating claimed as claim 1, further comprising: a first polarizer, disposed on a side of the first substrate that faces away from the liquid crystal layer.

9. The liquid crystal grating claimed as claim 8, further comprising: a second polarizer, disposed on a side of the second substrate that faces away from the liquid crystal layer, wherein directions of transmission axes of the first polarizer and the second polarizer are parallel or perpendicular to each other.

10. A 3D touch display device, comprising: a display; and a liquid crystal grating, disposed on a light exiting side of the display, wherein the liquid crystal grating is the liquid crystal grating as claimed in claim 1.

11. The 3D touch display device claimed as claim 10, wherein the second substrate of the liquid crystal grating is attached to the display.

12. The 3D touch display device claimed as claim 11, wherein the second substrate of the liquid crystal grating serves as an upper substrate of the display.

13. A driving method of the liquid crystal grating as claimed in claim 1, comprising:
   when the liquid crystal grating is in an operating state, a planar electrode in the liquid crystal grating is grounded, and driving strip-shaped electrodes in the liquid crystal grating by way of time-division driving.

14. The driving method claimed as claim 13, wherein the driving strip-shaped electrodes in the liquid crystal grating by way of time-division driving comprises:
   when the liquid crystal grating is in a 3D operating state, within a first time of any two adjacent drive cycles, nonzero constant voltages with the same amplitude and opposite polarities are applied to the strip-shaped electrodes of the liquid crystal grating, respectively; and within a second time of each drive cycle, a constant voltage having a nonzero amplitude is applied to the strip-shaped electrodes of the liquid crystal grating;
   when the liquid crystal grating is in a 2D operating state, within the first time of each drive cycle, a constant voltage having a zero amplitude is applied to the strip-shaped electrodes of the liquid crystal grating, and within the second time of each drive cycle, a constant voltage having a nonzero amplitude is applied to the strip-shaped electrodes of the liquid crystal grating.

15. The driving method claimed as claim 14, wherein the drive cycle is 16.67 ms, the first time is 12 ms, and the second time is 4.67 ms.

* * * * *